Patented Jan. 9, 1923.

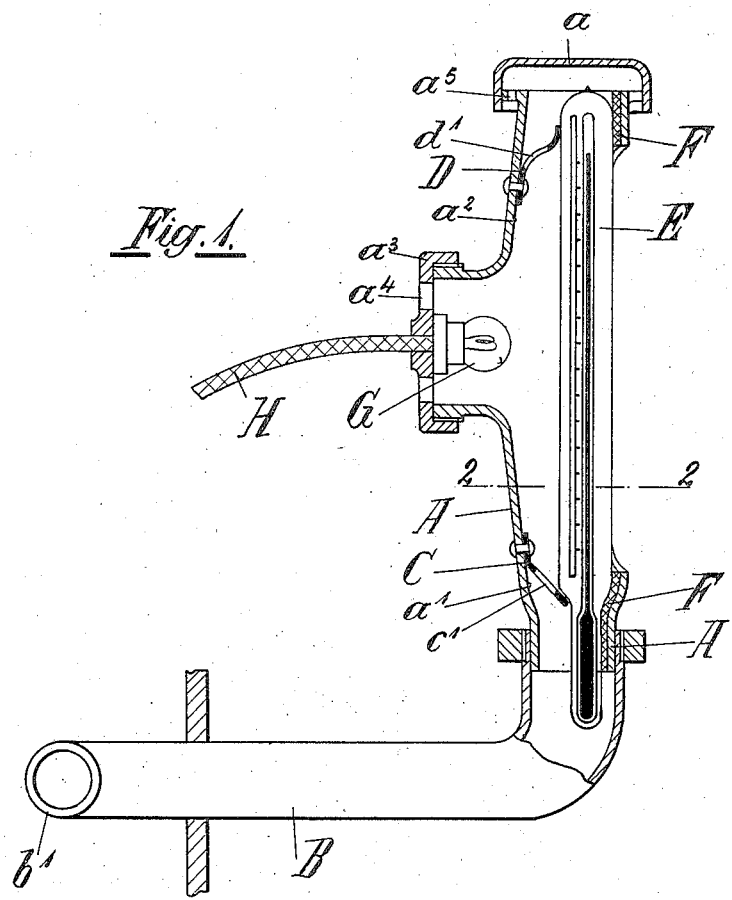
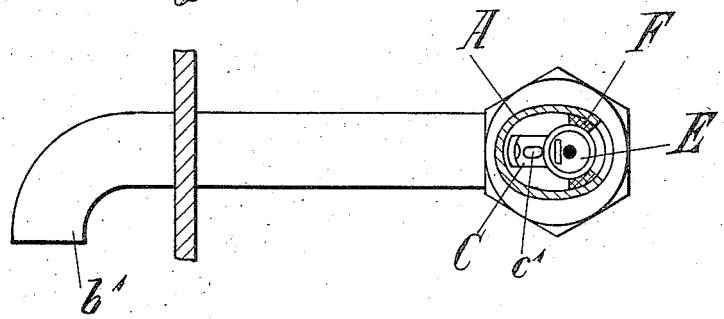

1,441,581

UNITED STATES PATENT OFFICE.

ERICH HILLIGARDT, OF FRIEDRICHSHAFEN, GERMANY, ASSIGNOR TO THE FIRM: LUFTSCHIFFBAU ZEPPELIN, GESELLSCHAFT MIT BESCHRANKTER HAFTUNG, OF FRIEDRICHSHAFEN, GERMANY.

THERMOMETER.

Application filed June 28, 1920. Serial No. 392,428.

*To all whom it may concern:*

Be it known that I, ERICH HILLIGARDT, a citizen of the German Empire, residing at Friedrichshafen, Germany, have invented certain new and useful Improvements in Thermometers, of which the following is a specification.

My invention refers to a thermometer adapted for use in aerial vehicles and allowing to ascertain easily and as exactly as possible the temperature of the outer air from the driver's seat or from the observation room of an aerial vehicle.

The thermometers of ordinary construction hitherto used for this purpose were exposed to the air current outside the vehicle at a more or less great distance from the observer's stand and owing to this distance difficulties were encountered in ascertaining the temperature. For night excursions a special lighting device had moreover to be provided outside the vehicle.

According to the present invention, now, I dispose the thermometer entirely within the car of the airship or other vehicle without the accuracy of its indications being impaired thereby. I effect this by enclosing the greater part at least of the thermometer within a casing connected at one end to an air pipe adapted to be set in the direction of travel, said casing being provided at its other end with outlet openings for the air passing along the thermometer. In this manner the thermometer may be arranged at a place affording protection against the wind and allowing it to be read off easily. The air led on to it by a pipe whose free end may assume the form of a nozzle.

This manner of measuring the temperature offers special advantages inasmuch as the influence of the sun rays is avoided. Artificial lighting can easily be provided by means of a lamp disposed in close proximity to the scale if care is only taken to cause the air utilized for measuring purposes to carry off the heat directly generated by the lamp, the heat generated by radiation in lamps of the size employed in this case being practically nil.

I further prefer surrounding the thermometer by a complete casing having its front part cut out in such a manner that on the thermometer being lodged therein, the frontal surface of the latter is applied to the casing and partly forms the front wall of the instrument. In order to facilitate the fitting in of theremometers of slightly differing sizes I prefer inserting between it and the casing a slotted strip of felt or the like, such strip serving at the same time as a protection against air and light peering through from without.

In the drawings affixed to this specification and forming part thereof an instrument according to my invention is illustrated by way of example. In the drawings—

Fig. 1 is a vertical longitudinal section.

Fig. 2 is a cross section on the line 2—2 (Fig. 1)

Referring to the drawings, A is the casing and B is a pipe removably connected thereto. C is a supporting spring fixed to the casing at $a^1$ and $d$ is a spring fixed thereto at $a^2$, said springs serving to press the thermometer E against a strip of felt F inserted between it and the slotted frontwall of the casing. An incandescent lamp G disposed in the rear wall of the casing is fed with current through a conductor H.

The air enters into the free end $b^1$, bent in the direction of travel of the pipe B and flows through it and through the casing A, leaving this latter through openings $a^4$ after having cooled the lamp. Another portion of the air escapes through the openings $a^5$ in the cover $a^6$. In order that the springs C D may not form a hindrance to the passage of the air slots, $c^1$ $d^1$ are provided therein.

The pipe B is connected with the casing in such a manner as to be easily replaced and swung around.

I claim:

1. The combination with a thermometer and a protective casing surrounding the same, of air admitting and discharging means on said casing adjacent the ends of the thermometer, spring acting supporting means on one of the walls of the casing engageable with the thermometer, and resilient supporting means spaced from each other and opposite the spring acting means on the opposite wall of the casing.

2. The combination with a thermometer and a protective casing therefor, of air admitting and air discharging means on said casing adjacent the ends of the thermometer, spring acting apertured supporting means spaced from each other upon one wall of the casing and engageable with the thermometer and additional supporting means on the opposite wall of the casing opposite the first-mentioned supporting means.

3. The combination with a thermometer of a substantially tubular frontally apertured enclosure for said thermometer, apertured spring acting supporting means upon said casing engageable near the ends of the thermometer, additional resilient supporting means opposite the first-mentioned supporting means connected to the casing and engageable with the thermometer, air admitting means on the casing near the thermometer bulb, and air outlets on said casing.

4. In a heat measuring device in combination, a thermometer, a casing partly in engagement with said thermometer and partly spaced therefrom and parallel thereto, and adapted to expose the scale thereof, an electric lamp, air outlets near said lamp, and means connected with said casing for conducting the outer air from the bottom end thereof past the thermometer bulb and along the thermometer tube, and supporting means for the thermometer mounted on said casing.

5. In an aircraft car in combination, a thermometer and a casing surrounding it, both being arranged within the said car, and a pipe connected with the bottom end of said casing and projecting through the car wall into the outer air, the free end of said pipe being turned in the direction of travel.

In testimony whereof I affix my signature.

ERICH HILLIGARDT.